United States Patent
Gokita

(10) Patent No.: US 10,073,788 B2
(45) Date of Patent: Sep. 11, 2018

(54) INFORMATION PROCESSING DEVICE AND METHOD EXECUTED BY AN INFORMATION PROCESSING DEVICE

(71) Applicant: FUJITSU LIMITED, Kawasaki-shi, Kanagawa (JP)

(72) Inventor: Shun Gokita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 119 days.

(21) Appl. No.: 15/286,664

(22) Filed: Oct. 6, 2016

(65) Prior Publication Data

US 2017/0115892 A1    Apr. 27, 2017

(30) Foreign Application Priority Data

Oct. 23, 2015   (JP) .................................. 2015-209087

(51) Int. Cl.

| | | |
|---|---|---|
| G06F 12/08 | (2016.01) | |
| G06F 12/0868 | (2016.01) | |
| G06F 3/06 | (2006.01) | |
| G06F 12/0891 | (2016.01) | |
| G06F 12/12 | (2016.01) | |
| G06F 12/0804 | (2016.01) | |
| G06F 12/123 | (2016.01) | |

(52) U.S. Cl.
CPC ........ *G06F 12/0868* (2013.01); *G06F 3/0611* (2013.01); *G06F 3/0652* (2013.01); *G06F 3/0685* (2013.01); *G06F 12/0891* (2013.01); *G06F 12/0804* (2013.01); *G06F 12/12* (2013.01); *G06F 12/123* (2013.01); *G06F 2212/60* (2013.01)

(58) Field of Classification Search
CPC ............. G06F 12/0804; G06F 12/0891; G06F 12/0893; G06F 2212/60; G06F 2212/604; G06F 12/0246; G06F 12/0868; G06F 2212/205; G06F 2212/1041; G06F 12/0808; G06F 12/122
See application file for complete search history.

(56) References Cited

U.S. PATENT DOCUMENTS

2017/0060752 A1*   3/2017   Wei .................... G06F 12/08

FOREIGN PATENT DOCUMENTS

| JP | 6-89232 | 3/1994 |
|---|---|---|
| JP | 7-152649 | 6/1995 |
| JP | 10-187540 | 7/1998 |

* cited by examiner

*Primary Examiner* — Reginald G Bragdon
*Assistant Examiner* — Thanh D Vo
(74) *Attorney, Agent, or Firm* — Staas & Halsey LLP

(57) ABSTRACT

An information processing device includes a first memory and a processor configured to receive first data from the second memory, receive second data from the third memory, store the first data and the second data in the first memory, specify a first latency of the second memory and a second latency of the third memory, specify a first access frequency to the second memory, and a second access frequency to the third memory, select one of the first data and the second data based on first value, a second value, a first data volume of the first data, and a second data volume of the second data, the first value being obtained by multiplying the first latency and the first access frequency, and the second value being obtained by multiplying the second latency and the second access frequency, and delete at least a part of data.

17 Claims, 9 Drawing Sheets

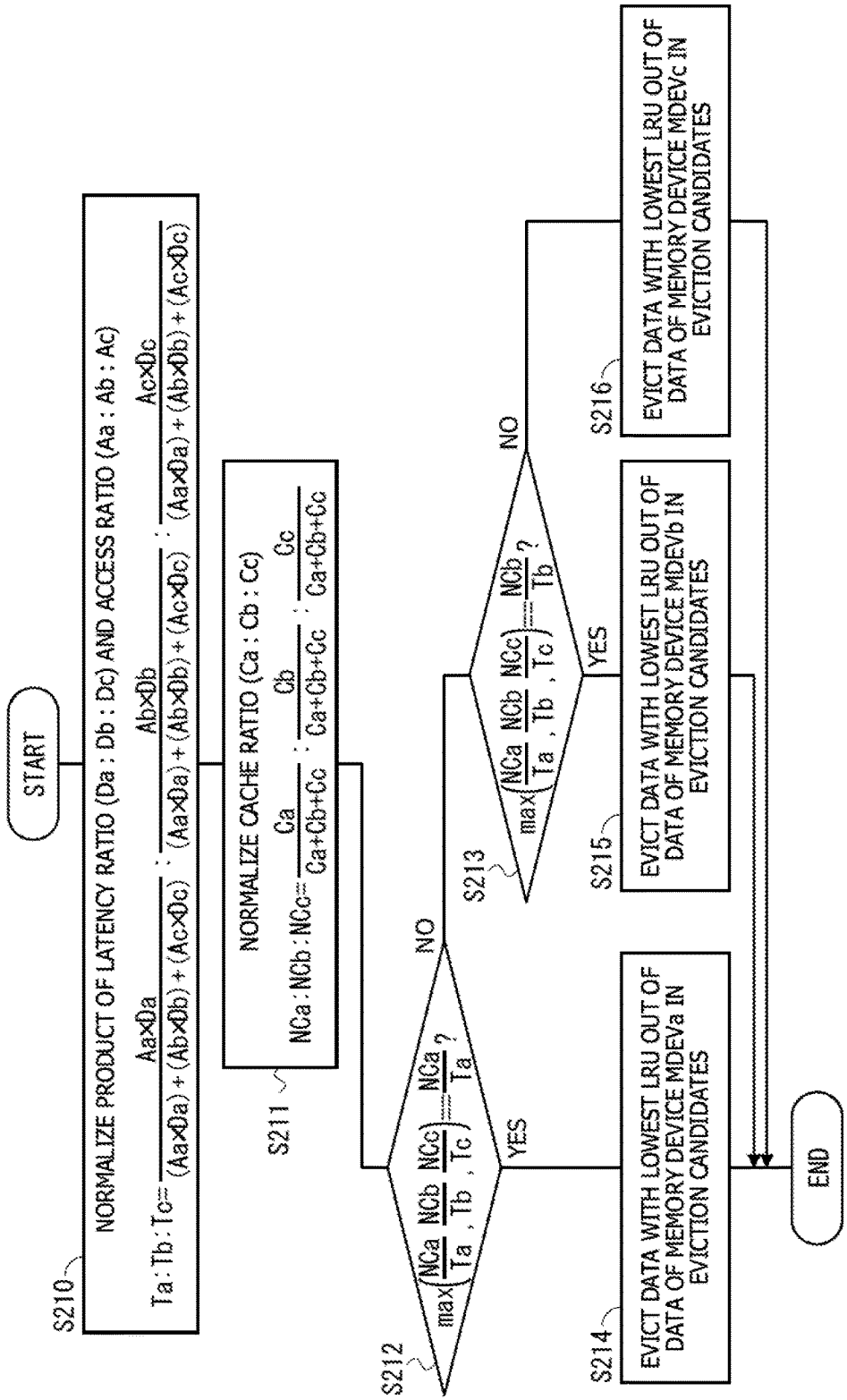

INFORMATION PROCESSING DEVICE AND METHOD EXECUTED BY AN INFORMATION PROCESSING DEVICE

CROSS-REFERENCE TO RELATED APPLICATION

This application is based upon and claims the benefit of priority of the prior Japanese Patent Application No. 2015-209087, filed on Oct. 23, 2015, the entire contents of which are incorporated herein by reference.

FIELD

The embodiments discussed herein are related to an information processing device and a method executed by an information processing device.

BACKGROUND

An arithmetic processing unit such as a central processing unit (CPU) has a cache memory that is accessible at a higher speed compared with the main memory. The cache memory is disposed between a processor core such as a CPU core which is an arithmetic processor and the main memory, and stores part of the data stored in the main memory.

When the cache memory stores data specified in an access request from the processor core (cache hit), the cache memory transfers the stored data to the processor core. Also, when the data specified in the access request is not stored in the cache memory (cache miss), the cache memory obtains the data from the main memory, transfers the obtained data to the processor core, and stores the data obtained from the main memory. Thus, the data specified in the access request is registered in the cache memory.

It is to be noted that when no free space is available for registering the data obtained from the main memory, one of the pieces of data stored in the cache memory is evicted to generate free space. The least recently used (LRU) algorithm is known as a technique that selects data to be evicted from the cache memory. According to the LRU algorithm, the cache memory selects data to be evicted, which has not been used for the longest time.

It is to be noted that for a system in which the access time to the main memory varies with the storage destination of data in the main memory, a technique has been proposed that selects data to be evicted from the cache memory by a selection algorithm different from the LRU algorithm (for instance, see Japanese Laid-open Patent Publication Nos. 10-187540, 7-152649). According to this type of selection algorithm, a piece of data with the shortest access time to the main memory is preferentially selected from the data stored in the cache memory as the data to be evicted from the cache memory.

SUMMARY

According to an aspect of the invention, an information processing device includes a first memory, and a processor coupled to the first memory and configured to transmit a first request requesting a second memory to send a first data, receive the first data from the second memory, transmit a second request requesting a third memory to send a second data, receive the second data from the third memory, store the first data and the second data in the first memory, specify a first latency that is a time from when the second memory receives the first request to when the second memory sends the first data to the information processing device, and a second latency that is a time from when the third memory receives the second request to when the third memory sends the second data to the information processing device, specify a first access frequency from the information processing device to the second memory, and a second access frequency from the information processing device to the third memory, select one of the first data and the second data based on a first ratio of a first value to a second value and a second ratio of a first data volume of the first data stored in the first memory to a second data volume of the second data stored in the first memory, the first value being obtained by multiplying the first latency and the first access frequency, and the second value being obtained by multiplying the second latency and the second access frequency, and delete, from the first memory, at least a part of the selected first data or at least a part of the selected second data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a flow chart illustrating an example operation of the cache memory illustrated in FIG. 8.

DESCRIPTION OF EMBODIMENTS

In recent years, research on main memory including a dynamic random access memory (DRAM) and a non-volatile random access memory (NVRAM) has been conducted. NVRAM is, for instance, a phase change memory (PCM), a resistive RAM (ReRAM), or a magnetoresistive RAM (MRAM). The techniques in related art, such as the LRU algorithm do not assume that the main memory includes a plurality of memory devices (for instance, a DRAM and an NVRAM) with different access times. For this reason, when a technique in related art, such as the LRU algorithm is applied to a cache memory coupled to the main memory including a plurality of memory devices (for instance, a DRAM and an NVRAM) with different access times, data to be evicted from the cache memory may not be appropriately selected. When data to be evicted from the cache memory is not appropriately selected, for instance, the average of access times to the data stored in the main memory increases compared with the case where data to be evicted from the cache memory is appropriately selected.

With an algorithm that preferentially selects data with a shorter access time to the main memory as the data to be evicted from the cache memory, when access centers to a memory device having a shorter access time than other memory devices, the frequency of cache miss may increase. In this case, the average of access times to the data stored in the main memory increases compared with the case where data to be evicted from the cache memory is appropriately selected.

Hereinafter, embodiments will be described with reference to the drawings.

Figure 1:
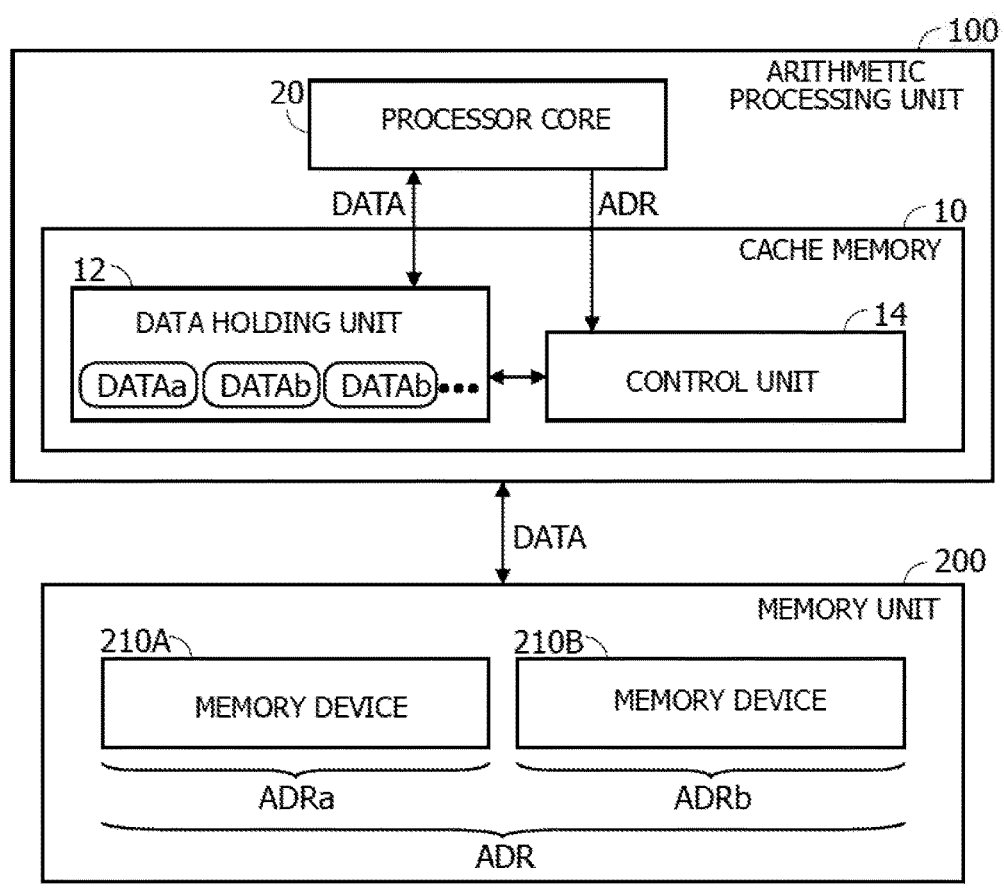
FIG. 1 is a diagram illustrating an embodiment of a cache memory and a method of controlling the cache memory.

FIG. 1 illustrates an embodiment of a cache memory and a method of controlling the cache memory. It is to be noted that the configuration of a cache memory 10 is not limited to the example illustrated in FIG. 1. The cache memory 10 illustrated in FIG. 1 is disposed between a processor core 20 such as a CPU core which is an arithmetic processor and a memory unit 200. For instance, the cache memory 10 and the processor core 20 are mounted in an arithmetic processing unit 100 such as a CPU. It is to be noted that, for instance, when the cache memory has a hierarchical structure, the cache memory 10 may be disposed externally of the arithmetic processing unit 100. The memory unit 200 has a plurality of memory devices 210 (210A, 210B) with different latencies each of which indicates a time from an access request to data transfer. For instance, the memory device 210A is a DRAM, and the memory device 210B is an NVRAM with a longer latency than that of the DRAM.

For instance, the cache memory 10 stores part of data DATA (DATAa, DATAb) stored in the memory unit 200. The data DATAa indicates data DATA stored in the memory device 210A in the memory unit 200, and data DATAb indicates data DATA stored in the memory device 210B in the memory unit 200. Out of addresses ADR indicating storage destinations of data DATA in the memory unit 200, address ADRa indicates an address ADR assigned to the memory device 210A, and address ADRb indicates an address ADR assigned to the memory device 210B.

The cache memory 10 has a data holding unit 12 that holds part of the data DATA (DATAa, DATAb) stored in the memory devices 210, and a control unit 14. For instance, when an access request is received from the processor core 20, the cache memory 10 determines whether or not data DATA (hereinafter referred to as request data DATA) corresponding to the address ADR specified in the access request is held in the data holding unit 12.

When the request data DATA is held in the data holding unit 12, the cache memory 10 transfers the data DATA held in the data holding unit 12 to the processor core 20. When the request data DATA is not held in the data holding unit 12, the cache memory 10 obtains the request data DATA from the memory unit 200, and transfers the obtained request data DATA to the processor core 20. In addition, the cache memory 10 stores the request data DATA obtained from the memory unit 200 in the data holding unit 12. In this manner, the request data DATA corresponding to the address ADR specified in the access request is registered in the cache memory 10.

It is to be noted that when no free space is available for registering the request data DATA obtained from the memory unit 200, the cache memory 10 evicts one of pieces of the data DATA held in the data holding unit 12 to generate free space. The processing of selecting data DATA to be evicted from the cache memory 10 is performed by the control unit 14. Hereinafter, data DATA evicted from the cache memory 10, that is, data DATA evicted from the data holding unit 12, is also referred to as eviction data DATA.

For the memory devices 210A, 210B, the control unit 14 calculates the product between the ratio of the latencies of the memory devices 210A, 210B, and the ratio of access frequencies to the memory devices 210A, 210B. Hereinafter, the ratio of the latencies of the memory devices 210A, 210B is also referred to as the latency ratio, and the ratio of access frequencies to the memory devices 210A, 210B is also referred to as the access ratio.

For instance, when the latency of the memory device 210A is 10 nanoseconds (ns) and the latency of the memory device 210B is 50 ns, the latency ratio of the memory device 210A and the memory device 210B is 1:5. Also, in the case where the occurrence frequency of access request to the address ADRa is twice as much as the occurrence frequency of access request to the address ADRb, the access ratio is 2:1. In this case, the product of the latency ratio of the memory devices 210A, 210B and the access ratio of the memory devices 210A, 210B is 2:5 ($=(1\times2):(5\times1)$).

Here, the latency of each of the memory devices 210 used for calculation of the latency ratio may be, for instance, the average of the latency at the time of reading data DATA and the latency at the time of writing data DATA. Alternatively, the latency of each memory device 210 used for calculation of the latency ratio may be the latency at the time of reading data DATA only, or the latency at the time of writing data DATA only. It is to be noted that the latency at the time of reading data DATA may be, for instance, the time until the memory device 210 outputs the first data since receiving a read request, or the time until the memory device 210 outputs the last data. Also, the latency at the time of writing data DATA may be, for instance, the time until the memory device 210 writes the first data since receiving a write request, or the time until writing of the last data is completed.

Also, the control unit 14 calculates the ratio (hereinafter also referred to as the cache ratio) of data volumes indicating the volumes of the data DATA transferred from the memory devices 210A, 210B and held in the data holding unit 12. It is to be noted that the cache ratio is the ratio of data volumes of the memory devices 210A, 210B when the data DATA held in the data holding unit 12 is divided between the memory devices 210A, 210B. For instance, in the case where 30% of the data DATA held in the data holding unit 12 is the data DATAa corresponding to the address ADRa and 70% thereof is the data DATAb corresponding to the address ADRb, the cache ratio of the memory devices 210A, 210B is 3:7. The control unit 14 compares the product of the latency ratio and the access ratio with the cache ratio.

The control unit 14 then selects eviction data DATA so that the cache ratio approaches the product of the latency ratio and the access ratio. For instance, in the case where the cache ratio of the memory devices 210A, 210B is 3:7 and the product of the latency ratio and the access ratio of the memory devices 210A, 210B is 2:5, the control unit 14 selects the data DATAa as eviction data DATA. In this manner, the control unit 14 controls eviction of the data DATA from the data holding unit 12 based on a result of comparison between the product of the latency ratio and the access ratio, and the cache ratio.

Here, for instance, in the LRU algorithm, data DATA, which has not been used for the longest time, is evicted from the data holding unit 12, and thus the cache ratio approaches the access ratio regardless of the latencies of the memory devices 210A, 210B. In other words, in the LRU algorithm, when eviction data DATA is selected, the latencies of the memory devices 210A, 210B are not taken into consideration. Therefore, in the LRU algorithm, it may occur that frequency of access to the memory device 210B having a longer latency than that of the memory device 210A increases. In this case, the average (hereinafter referred to as the average penalty) of the access times to the data DATA specified by address ADR assigned to the memory unit 200 increases.

Also, with an algorithm that preferentially selects data DATA with a shorter access time to the memory unit 200 as eviction data DATA, the access ratio of the memory devices 210A, 210B is not taken into consideration. Thus, the data DATAb stored in the memory device 210B having a longer latency than that of the memory device 210A may remain in the data holding unit 12 in an excessive volume with respect to the access frequency. Therefore, in the case where access centers to the address ADRa assigned to the memory device 210A, the frequency of cache miss may increase and the average penalty of the cache memory 10 may increase.

On the other hand, the control unit 14 selects eviction data DATA based on the cache ratio and information (the product of the latency ratio and the access ratio) in which the latencies of the memory devices 210A, 210B are weighted by the respective access frequencies to the memory devices 210A, 210B. Thus, the cache memory 10 is able to avoid one of data DATAa, DATAb for instance from remaining in the data holding unit 12 in an excessive volume with respect to the access frequency. In other words, data DATA to be evicted from the data holding unit 12 may be appropriately selected. Consequently, the cache memory 10 is able to restrain the increase in the average penalty.

In the above-described embodiment illustrated in FIG. 1, the control unit 14 selects eviction data DATA to be evicted from the cache memory 10, based on the product of the latency ratio and the access ratio of the memory devices 210A, 210B, and the cache ratio of the memory devices 210A, 210B. Thus, data DATA to be evicted from the cache memory 10 may be appropriately selected. Consequently, it is possible to reduce the average penalty of the cache memory 10. In other words, it is possible to reduce the access time to the data DATA stored in the memory unit 200.

Figure 2:
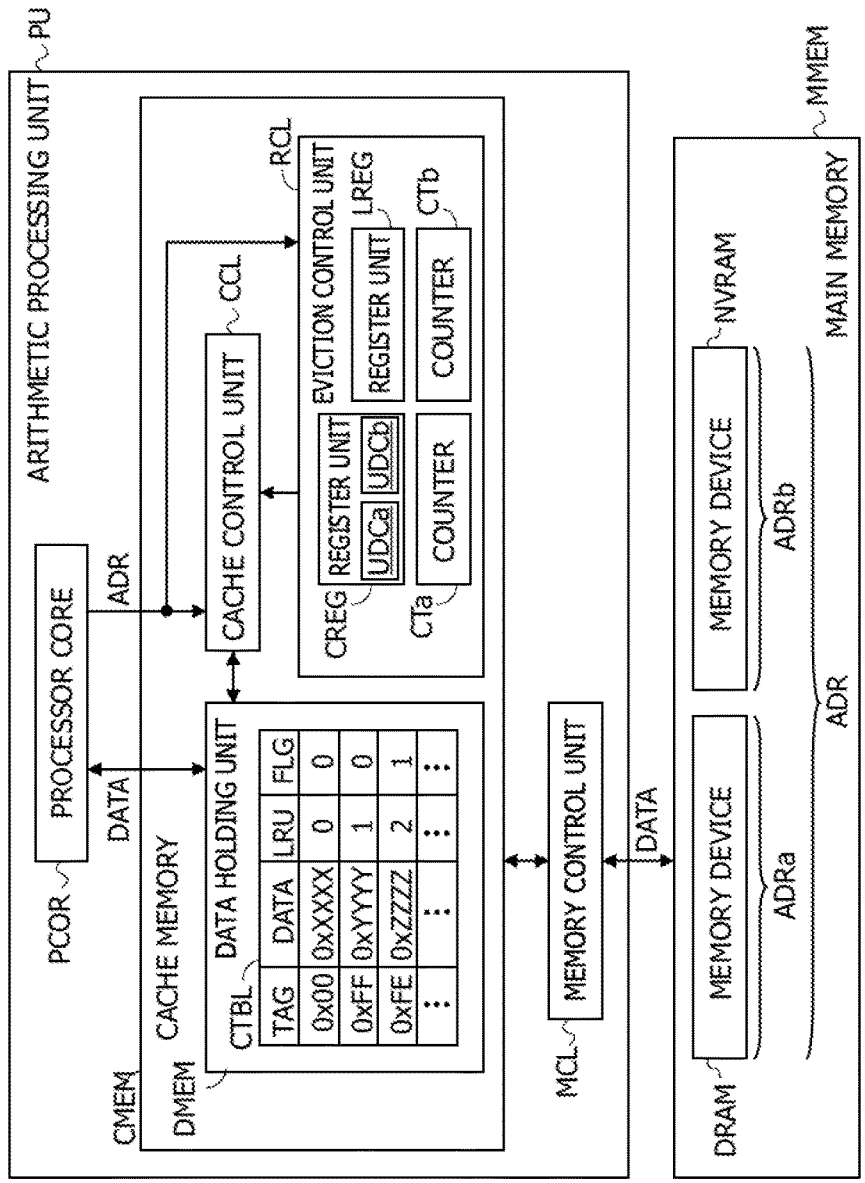
FIG. 2 is a diagram illustrating another embodiment of a cache memory and a method of controlling the cache memory.

FIG. 2 is a diagram illustrating another embodiment of a cache memory and a method of controlling the cache memory. It is to be noted that the configuration of the cache memory CMEM is not limited to the example illustrated in FIG. 2. The same or similar components as or to the components described with reference to FIG. 1 are labeled with the same or similar symbol, and a detailed description thereof is omitted. In FIG. 2 and subsequently, for the count value of counters (such as CTa, CTb, UDCa, UDCb), the same symbol is used as the counter.

The cache memory CMEM illustrated in FIG. 2 is disposed between a processor core PCOR such as a CPU core and the main memory MMEM, and makes access to the main memory MMEM via a memory control unit MCL. It is to be noted that the memory control unit MCL executes data transfer and other operations between the cache memory CMEM and the main memory MMEM.

The cache memory CMEM, the processor core PCOR, and the memory control unit MCL are mounted in an arithmetic processing unit PU such as a CPU. It is to be noted that, for instance, when the cache memory has a hierarchical structure, the cache memory CMEM may be disposed externally of the arithmetic processing unit PU.

The main memory MMEM has a plurality of memory devices DRAM, NVRAM with different latencies from each other. For instance, the memory device DRAM is a DRAM and the memory device NVRAM is an NVRAM with a longer latency than that of the DRAM. Hereinafter, the memory devices DRAM, NVRAM are also referred to as DRAM, NVRAM, respectively.

The cache memory CMEM has a data holding unit DMEM that holds part of the data DATA stored in one of the memory devices DRAM, NVRAM, an eviction control unit RCL, and a cache control unit CCL.

The data holding unit DMEM has a cache table CTBL. The data DATA held in the data holding unit DMEM is managed, for instance, by the cache table CTBL in units of cache line of the cache memory CMEM.

For instance, the cache table CTBL has elements such as a tag TAG, data DATA, a LRU bit, and a flag FLG corresponding to a bit group of part of the address ADR. In FIG. 2, "0x" in 0x00, 0xXXXX and others illustrated as an example of tag TAG and data DATA indicates hexadecimal notation.

A smaller number of the LRU bit indicates older data DATA (data DATA which has not been used for a longer time). The flag FLG is an example of type information indicating one of the memory devices DRAM, NVRAM as a return destination (that is, a transfer source) of data DATA held in the data holding unit DMEM. Also, the area holding the flag FLG in the data holding unit DMEM is an example of information holding unit that holds type information.

For instance, data DATA (data 0xXXXX of tag 0x00 and data 0xYYYY of tag 0xFF in the example illustrated in FIG. 2) corresponding to flag FLG set to "0" is the data DATA corresponding to the address ADRa, and is returned to DRAM. Also, data DATA (data 0xZZZZ of tag 0xFE in the example illustrated in FIG. 2) corresponding to flag FLG set to "1" is the data DATA corresponding to the address ADRb, and is returned to NVRAM. The information in the cache table CTBL is updated by control of the cache control unit CCL.

The cache control unit CCL, when receiving an access request from the processor core PCOR, determines whether or not request data DATA corresponding to an address ADR (hereinafter also referred to as a request address ADR) specified in the access request is held in the data holding unit DMEM.

When the request data DATA is held in the data holding unit DMEM, the cache control unit CCL transfers the data DATA held in the data holding unit DMEM to the processor core PCOR. When the request data DATA is not held in the data holding unit DMEM, the cache control unit CCL obtains the request data DATA from the main memory MMEM via the memory control unit MCL, and transfers the obtained request data DATA to the processor core PCOR. In addition, the cache control unit CCL stores the request data DATA obtained from the main memory MMEM in the data holding unit DMEM. For instance, the cache control unit CCL updates the cache table CTBL by registering the request data DATA obtained from the main memory MMEM in the cache table CTBL. Thus, the request data DATA corresponding to the address ADR specified in the access request is registered in the cache table CTBL of the cache memory CMEM.

It is to be noted that when no free space is available for registering the request data DATA obtained from the main memory MMEM, the cache control unit CCL evicts one of the data DATA held in the data holding unit DMEM. For instance, when no free space is available for registering the request data DATA obtained from the main memory MMEM, the cache control unit CCL evicts data DATA from the cache memory CMEM, which is selected by the eviction control unit RCL. Specifically, the cache control unit CCL and the eviction control unit RCL are each an example of a control unit that controls eviction of data DATA from the data holding unit DMEM.

For instance, the eviction control unit RCL has a plurality of counters CT (CTa, CTb) and register units LREG, CREG, the counters CT being configured to count access to the main memory MMEM for each of the memory devices DRAM, NVRAM. For instance, when request address ADR transferred to the eviction control unit RCL indicates the address ADRa, the counter CTa counts access to DRAM by incrementing the count. Also, when the request address ADR indicates the address ADRb, the counter CTb counts access to NVRAM by incrementing the count. Each counter CT is reset periodically.

The register unit CREG is an example of a first register unit that holds first information that indicates a ratio (cache ratio) of data volumes indicating the volumes of the data DATA transferred from the memory devices DRAM, NVRAM and held in the data holding unit DMEM. For instance, the register unit CREG has up-down counters UDC (UDCa, UDCb).

The up-down counter UDCa counts the number of cache lines that hold the data DATA (hereinafter also referred to as data DATA of DRAM) transferred from DRAM to the cache memory CMEM. In addition, the up-down counter UDCb counts the number of cache lines that hold the data DATA (hereinafter also referred to as data DATA of NVRAM) transferred from NVRAM to the cache memory CMEM. The register unit CREG then holds the count values UDCa, UDCb (in other words, the cache ratio of the DRAM, NVRAM) of each up-down counter UDC. Each up-down counter UDC is reset periodically, for instance, when the number of cache lines of the cache memory CMEM exceeds a number countable by the up-down counter UDC.

The register unit LREG is an example of a second register unit that holds second information indicating the ratio of the latencies of the memory devices DRAM, NVRAM. In the example illustrated in FIG. 2, the register unit LREG holds the value of each latency (that is, the latency ratio of DRAM, NVRAM) predetermined by the specification or the like of DRAM, NVRAM. For instance, the latency of each of DRAM, NVRAM is given to the eviction control unit RCL as a parameter from a firmware or the like.

The eviction control unit RCL calculates the product of, for instance, the latency ratio and the access ratio of the memory devices DRAM, NVRAM using the register unit LREG and the counters CTa, CTb. The eviction control unit RCL then compares the product of the latency ratio and the access ratio with the cache ratio, and selects eviction data DATA based on a result of the comparison.

Here, the average LAV of the latency of the main memory MMEM is given by Expression (1).

$$LAV=(Aa \times LTa \times Ma+Ab \times LTb \times Mb)/(Aa+Ab) \quad (1)$$

Aa, Ab in Expression (1) indicate the respective rates of access to DRAM, NVRAM, and LTa, LTb indicate the respective latencies of DRAM, NVRAM. Also, Ma in Expression (1) indicates the cache miss rate of access to the address ADRa assigned to DRAM, and Mb indicates the cache miss rate of access to the address ADRb assigned to NVRAM.

Although the average LAV of the latency of the main memory MMEM may be optimized using Expression (1) if cache miss rates Ma, Mb are known, the cache miss rates Ma, Mb are not easily determined because how the cache miss rates change depends on a work load such as a CPU usage rate. For this reason, the cache memory CMEM controls eviction of data DATA without using the cache miss rates Ma, Mb. For instance, the cache memory CMEM controls eviction of data DATA so that the cache ratio of DRAM, NVRAM approaches the product of the latency ratio and the access ratio of DRAM, NVRAM. Thus, it is possible to reduce the average LAV of the latency of the main memory MMEM.

For instance, when the latencies of DRAM, NVRAM are 10 ns and 50 ns (LTa=10 ns, LTb=50 ns), respectively, the average LAV of the latency of the main memory MMEM is as follows. It is to be noted that the rates of access to DRAM, NVRAM are assumed to be 2/3, 1/3 (APa=2/3, APb=1/3), respectively.

In the cache memory CMEM, the cache ratio of DRAM, NVRAM approaches the product (2:5) of the latency ratio (1:5) and the access ratio (2:1) of DRAM, NVRAM.

For instance, when the cache ratio of DRAM, NVRAM becomes "2:5" and the cache miss rates Ma, Mb of DRAM, NVRAM become 15%, 5%, respectively, the average LAV of the latency of the main memory MMEM is approximately 1.8 ns from Expression (1).

On the other hand, in the LRU algorithm, the cache ratio of DRAM, NVRAM approaches the access ratio (2:1) of DRAM, NVRAM. For instance, when the cache ratio of DRAM, NVRAM becomes "2:1" and both cache miss rates Ma, Mb of DRAM, NVRAM become 10%, the average LAV of the latency of the main memory MMEM is approximately 2.3 ns from Expression (1).

Also, in an algorithm that preferentially evicts data DATA of DRAM which has a shorter latency than NVRAM, some data DATA of NVRAM may remain in the data holding unit DMEM in an excessive volume with respect to the access frequency. For instance, when the cache ratio of DRAM, NVRAM becomes "1:9" and the cache miss rates Ma, Mb of DRAM, NVRAM become 30%, 2%, respectively, the average LAV of the latency of the main memory MMEM is approximately 2.3 ns from Expression (1).

In this manner, the cache memory CMEM allows the average LAV of the latency of the main memory MMEM to be reduced compared with the LRU algorithm.

Figure 3:
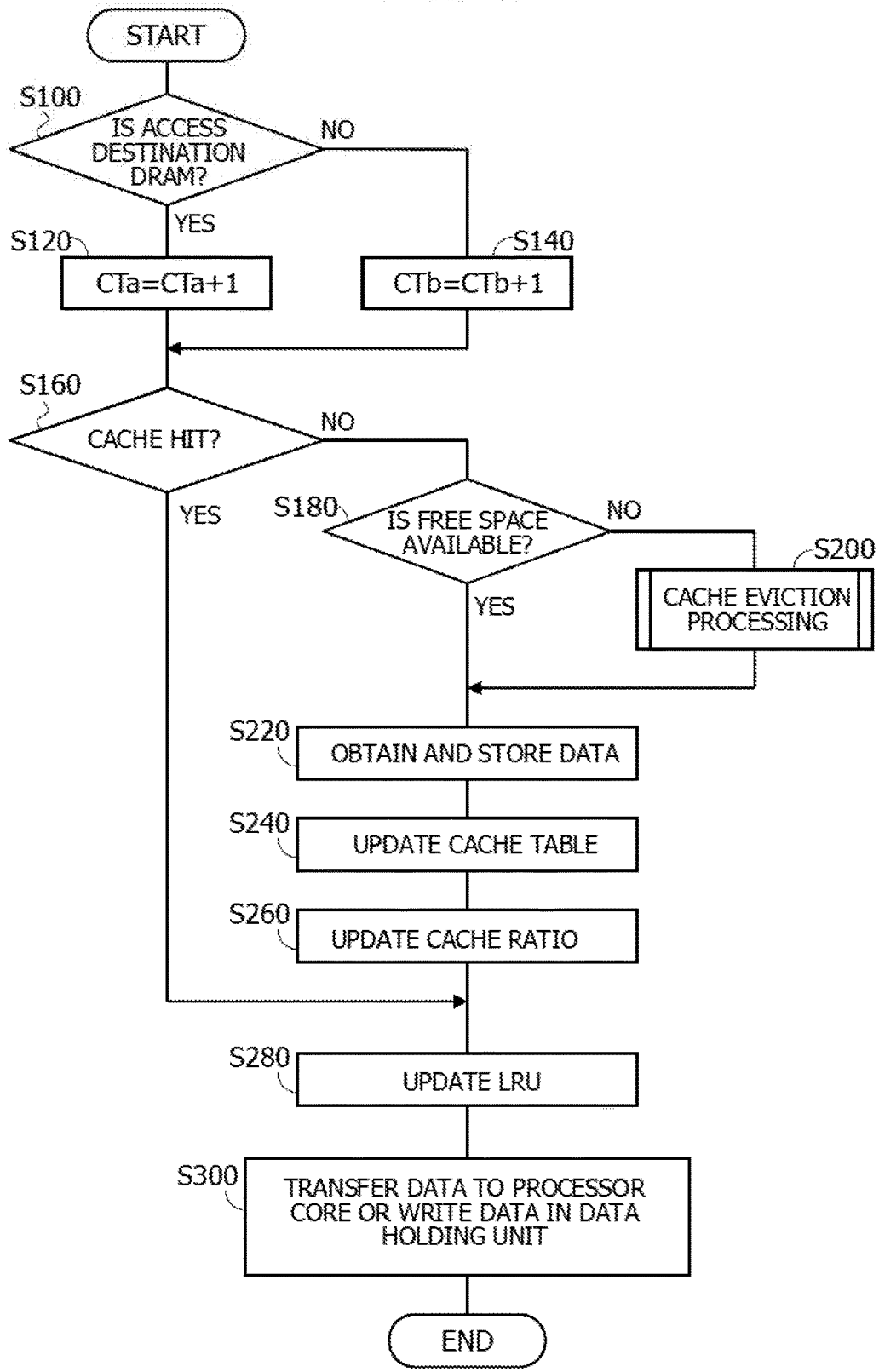
FIG. 3 is a flow chart illustrating an example operation of the cache memory illustrated in FIG. 2.

FIG. 3 is a flow chart illustrating an example operation of the cache memory CMEM illustrated in FIG. 2.

In step S100, the eviction control unit RCL determines whether or not the access destination (storage destination of data DATA as the access target) is DRAM based on the address ADR (request address ADR) received from the processor core PCOR. For instance, when the request address ADR indicates the address ADRa assigned to DRAM, the eviction control unit RCL determines that the access destination is DRAM. Also, when the request address ADR indicates the address ADRb assigned to NVRAM, the eviction control unit RCL determines that the access destination is NVRAM.

When the access destination is DRAM, the operation of the cache memory CMEM proceeds to step S120. On the other hand, when the access destination is not DRAM (in short, when the access destination is NVRAM), the operation of the cache memory CMEM proceeds to step S140.

In step S120, the eviction control unit RCL increments the count value CTa of the counter CTa (CTa=CTa+1). After the processing in step S120 is performed, the operation of the cache memory CMEM proceeds to step S160.

In step S140, the eviction control unit RCL increments the count value CTb of the counter CTb (CTb=CTb+1). After the processing in step S140 is performed, the operation of the cache memory CMEM proceeds to step S160.

In step S160, the cache control unit CCL determines whether or not a cache hit occurs in the cache memory CMEM based on the address ADR (request address ADR) received from the processor core PCOR. For instance, when the data DATA specified in the request address ADR is registered in the cache table CTBL, the cache control unit CCL determines that a cache hit occurs in the cache memory CMEM.

When a cache hit occurs in the cache memory CMEM, the operation of the cache memory CMEM proceeds to step S280. On the other hand, when no cache hit occurs in the cache memory CMEM (in other words, when a cache miss occurs), the operation of the cache memory CMEM proceeds to step S180.

In step S180, the cache control unit CCL determines whether or not free space is available for registering the data DATA specified in the request address ADR. When free space is available, the operation of the cache memory CMEM proceeds to step S220. On the other hand, when no free space is available, the operation of the cache memory CMEM proceeds to step S200.

In step S200, the cache memory CMEM performs cache eviction processing. Thus, a free space is generated. The details of the cache eviction processing will be described with reference to FIG. 4. After the processing in step S200 is performed, the operation of the cache memory CMEM proceeds to step S220.

In step S220, the cache control unit CCL obtains the data DATA specified by the request address ADR from the main memory MMEM, and stores the data DATA obtained from the main memory MMEM in free space of the data holding unit DMEM. After the processing in step S220 is performed, the operation of the cache memory CMEM proceeds to step S240.

In step S240, the cache control unit CCL registers in the cache table CTBL information on the data DATA (data DATA specified by the request address ADR) stored in the data holding unit DMEM, and updates the cache table CTBL. Thus, the data DATA specified by the request address ADR is registered in the cache table CTBL. After the processing in step S240 is performed, the operation of the cache memory CMEM proceeds to step S260.

In step S260, the eviction control unit RCL updates the cache ratio. For instance, the eviction control unit RCL increments the count value of the up-down counter UDC corresponding to the data DATA (the data DATA obtained from the main memory MMEM by the processing in step S220) specified by the request address ADR.

It is to be noted that when the cache eviction processing in step S200 is performed, the eviction control unit RCL decrements the count value of the up-down counter UDC corresponding to the data DATA evicted from the data holding unit DMEM. For instance, when the data DATA of DRAM is evicted from the data holding unit DMEM by the cache eviction processing in step S200, the eviction control unit RCL decrements the count value UDCa of the up-down counter UDCa in the register unit CREG. In addition, when the data DATA of NVRAM is evicted from the data holding unit DMEM by the cache eviction processing in step S200, the eviction control unit RCL decrements the count value UDCb of the up-down counter UDCb in the register unit CREG.

After the processing in step S260 is performed, the operation of the cache memory CMEM proceeds to step S280.

In step S280, the cache control unit CCL updates the LRU bit of the cache table CTBL. After the processing in step S280 is performed, the operation of the cache memory CMEM proceeds to step S300.

In step S300, when the access request is a read request, the cache control unit CCL transfers the data DATA obtained from the main memory MMEM to the processor core PCOR. Alternatively, when the access request is a write request, the cache control unit CCL writes write data DATA in the data holding unit DMEM, and updates the cache table CTBL.

It is to be noted that the operation of the cache memory CMEM is not limited to the example illustrated in FIG. 3. For instance, the cache memory CMEM may perform the processing (update of the cache ratio) in step S260 before performing the processing in step S220.

Figure 4:
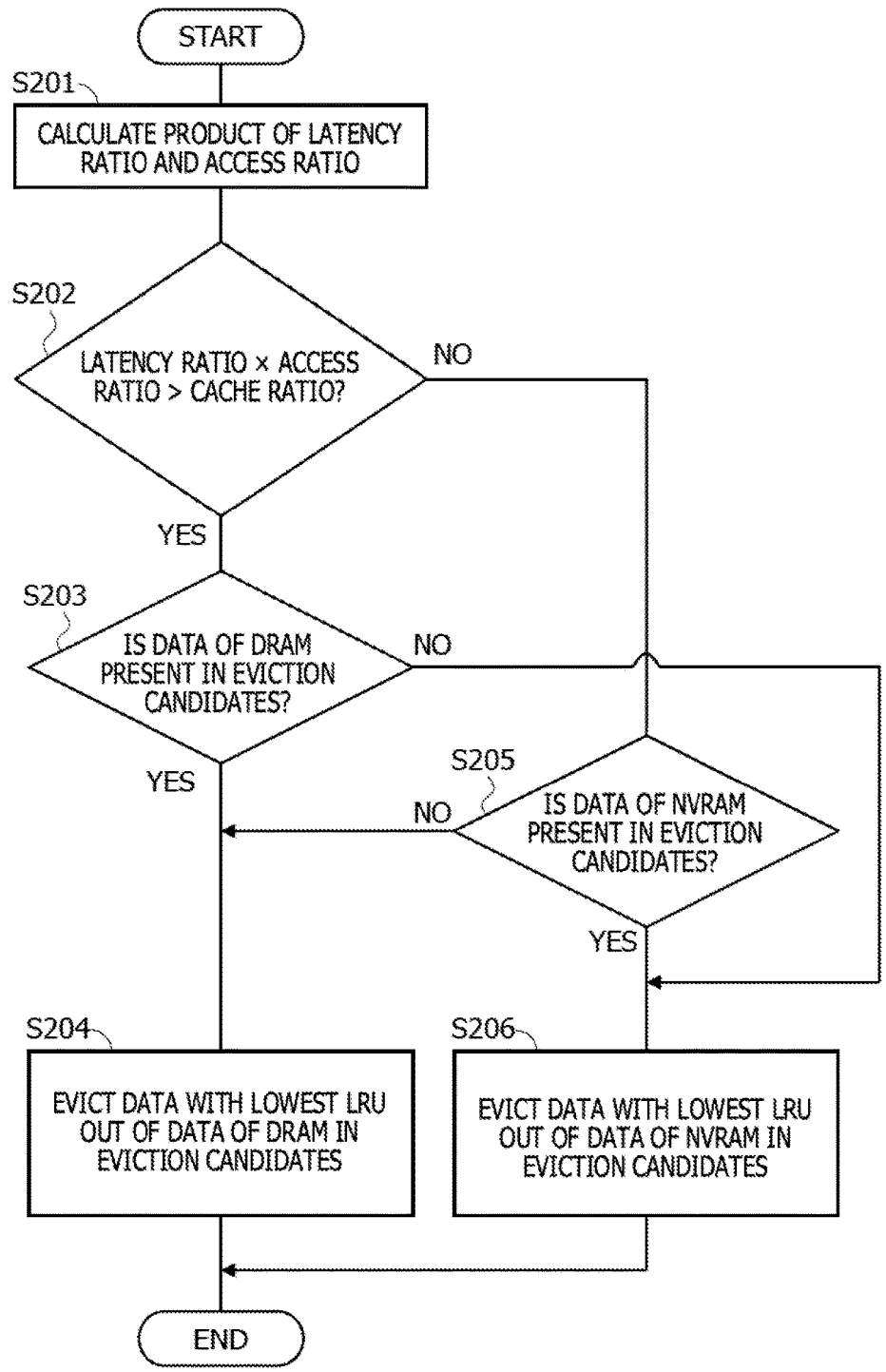
FIG. 4 is a flow chart illustrating example of cache eviction processing illustrated in FIG. 3.

FIG. 4 is a flow chart illustrating example of the cache eviction processing (the processing in step S200) illustrated in FIG. 3. In FIG. 4, the cache eviction processing is described by using an example of the case where the cache memory CMEM adopts n-way set associative algorithm (n is an integer greater than or equal to 2). In the n-way set associative algorithm, the data DATA held in one of n cache lines corresponding to an index specified by the request address ADR is evicted from the data holding unit DMEM, thereby generating free space. It is to be noted that the index corresponds to a bit group of part of the address ADR.

In step S201, the eviction control unit RCL refers to the register unit LREG, the counters CTa, CTb and calculates the product of the latency ratio and the access ratio for the memory devices (DRAM, NVRAM). For instance, when the information stored in the register unit LREG indicates "Da:Db", the latency ratio of DRAM, NVRAM is "Da:Db". Also, when the ratio of the count value CTa of the counter CTa and the count value CTb of the counter CTb is "Aa:Ab", the access ratio to DRAM, NVRAM is "Aa:Ab".

In this case, the product of the latency ratio of DRAM and NVRAM and the access ratio of DRAM and NVRAM for the memory devices (DRAM, NVRAM) is (Aa×Da):(Ab×Db). After the processing in step S201 is performed, the operation of the cache memory CMEM proceeds to step S202.

In step S202, the eviction control unit RCL determines whether or not the product of the latency ratio and the access ratio is greater than the cache ratio. For instance, when the ratio of the count value UDCa of the up-down counter UDCa and the count value UDCb of the up-down counter UDCb in the register unit CREG is "Ca:Cb", the cache ratio of DRAM and NVRAM is "Ca:Cb". In this case, the eviction control unit RCL determines whether or not the value "(Aa×Da)/(Ab×Db)" of the product of the latency ratio and the access ratio is greater than the value "Ca/Cb" of the cache ratio.

When the product of the latency ratio and the access ratio is greater than the cache ratio, the operation of the cache memory CMEM proceeds to step S203. On the other hand, when the product of the latency ratio and the access ratio is less than or equal to the cache ratio, the operation of the cache memory CMEM proceeds to step S205.

In step S203, the eviction control unit RCL determines whether or not data DATA of DRAM is present in candidates (hereinafter also referred to as eviction candidates) for data DATA to be evicted from the data holding unit DMEM. For instance, the eviction control unit RCL refers to the cache table CTBL and searches for flag FLG indicating DRAM (for instance, flag FLG set to "0") from flags FLG corresponding to the index specified by the request address ADR.

When flag FLG indicating DRAM is detected, the data DATA of DARM is held in one of the n cache lines corresponding to the index specified by the request address ADR. In other words, when flag FLG indicating DRAM is detected, data DATA of DRAM is present in the eviction candidates. When data DATA of DRAM is present in the eviction candidates, the operation of the cache memory CMEM proceeds to step S204.

On the other hand, when flag FLG indicating DRAM is not detected, the data DATA of DARM is not held in any of the n cache lines corresponding to the index specified by the request address ADR. In other words, when flag FLG indicating DRAM is not detected, data DATA of DRAM is not present in the eviction candidates. When data DATA of DRAM is not present in the eviction candidates, the operation of the cache memory CMEM proceeds to step S206.

In step S204, out of the data DATA of DRAM in the eviction candidates DRAM, the cache memory CMEM evicts data DATA with the lowest (oldest) LRU from the data holding unit DMEM.

For instance, out of the n cache lines corresponding to the index specified by the request address ADR, the eviction control unit RCL sets search object to the cache lines in which flag FLG of the cache table CTBL indicates DRAM. Out of the cache lines in the search object, the eviction control unit RCL selects a cache line with the smallest number of LRU bit in the cache table CTBL. Thus, a cache line, which holds eviction data DATA, is selected. In addition, the eviction control unit RCL notifies the cache control unit CCL of information (for instance, information indicating which cache line out of the n-way cache lines) indicating the selected cache line.

The cache control unit CCL evicts the data DATA (data DATA of DRAM) held in the cache line selected by the eviction control unit RCL, from the data holding unit DMEM. It is to be noted that, for instance, when eviction data DATA is updated by a store operation or the like and is in a dirty state, the cache control unit CCL writes back the eviction data DATA to DRAM in the main memory MMEM. When the eviction data DATA is not dirty (when the eviction data DATA is clean), the cache control unit CCL discards the eviction data DATA.

The data DATA is evicted from the data holding unit DMEM, and free space is thereby generated in the data holding unit DMEM and the cache eviction processing is completed. After the processing in step S204 is performed, the operation of the cache memory CMEM proceeds to step S220 illustrated in FIG. 3.

In step S205, the eviction control unit RCL determines whether or not data DATA of NVRAM is present in the eviction candidates. For instance, the eviction control unit RCL refers to the cache table CTBL and searches for flag FLG indicating DRAM (for instance, flag FLG set to "1") from flags FLG corresponding to the index specified by the request address ADR.

When flag FLG indicating NVRAM is detected, the data DATA of NVRAM is held in one of the n cache lines corresponding to the index specified by the request address ADR. In other words, when flag FLG indicating NVRAM is detected, data DATA of NVRAM is present in the eviction candidates. When data DATA of NVRAM is present in the eviction candidates, the operation of the cache memory CMEM proceeds to step S206.

On the other hand, when flag FLG indicating NVRAM is not detected, the data DATA of NVRAM is not held in any of the n cache lines corresponding to the index specified by the request address ADR. In other words, when flag FLG indicating NVRAM is not detected, data DATA of NVRAM is not present in the eviction candidates. When data DATA of NVRAM is not present in the eviction candidates, the cache memory CMEM performs the processing in step S204, and completes the cache eviction processing.

In step S206, out of the data DATA of NVRAM in the eviction candidates DRAM, the cache memory CMEM evicts data DATA with the lowest LRU from the data holding unit DMEM.

For instance, out of the n cache lines corresponding to the index specified by the request address ADR, the eviction control unit RCL sets search object to the cache lines in which flag FLG of the cache table CTBL indicates NVRAM. Out of the cache lines in the search object, the eviction control unit RCL selects a cache line with the smallest number of LRU bit in the cache table CTBL, and notifies the cache control unit CCL of information indicating the selected cache line. Thus, a cache line, which holds eviction data DATA, is selected.

The cache control unit CCL evicts the data DATA (data DATA of NVRAM) held in the cache line selected by the eviction control unit RCL, from the data holding unit DMEM. It is to be noted that, for instance, when eviction data DATA is in a dirty state, the cache control unit CCL writes back the eviction data DATA to NVRAM in the main memory MMEM. When the eviction data DATA is not dirty (when the eviction data DATA is clean), the cache control unit CCL discards the eviction data DATA.

The data DATA is evicted from the data holding unit DMEM, and free space is thereby generated in the data holding unit DMEM, then the cache eviction processing is completed. After the processing in step S206 is performed, the operation of the cache memory CMEM proceeds to step S220 illustrated in FIG. 3.

In this manner, the cache memory CMEM controls eviction of data DATA from the data holding unit DMEM so that the cache ratio approaches the product of the latency ratio and the access ratio. Thus, it is possible to avoid one of data DATA of DRAM and data DATA of NVRAM for instance from remaining in the data holding unit DMEM in an excessive volume with respect to the access frequency. Thus, data DATA to be evicted from the data holding unit DMEM may be appropriately selected. Consequently, the cache memory CMEM is able to restrain the increase in the average penalty.

It is to be noted that the cache eviction processing is not limited to the example illustrated in FIG. 4. For instance, the eviction control unit RCL may determine whether or not both the data DATA of DRAM and data DATA of NVRAM are present in the eviction candidates before performing the processing in step S201. When both the data DATA of DRAM and data DATA of NVRAM are present in the eviction candidates, the cache memory CMEM performs the processing of the operation illustrated in FIG. 4 with steps S203, S205 excluded. It is to be noted that only one of the data DATA of DRAM and data DATA of NVRAM is present in the eviction candidates, out of the data DATA in the eviction candidates DRAM, the cache memory CMEM evicts data DATA with the lowest LRU from the data holding unit DMEM.

Figure 5:
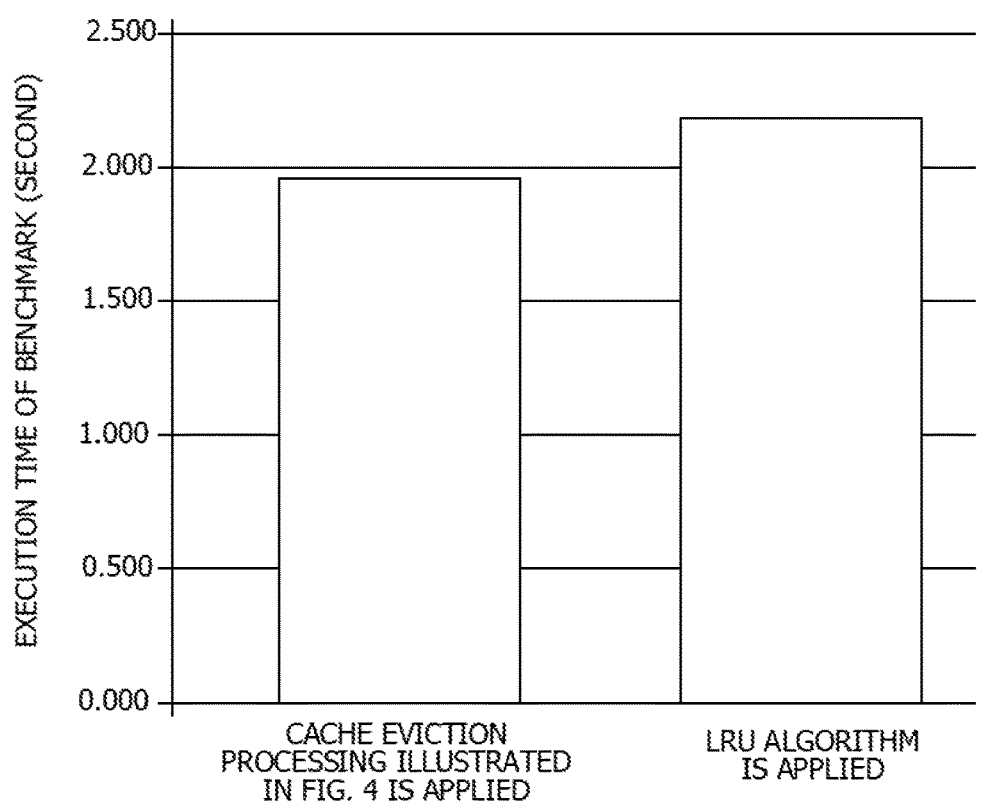
FIG. 5 is a graph illustrating a comparative example between the case where the cache eviction processing illustrated in FIG. 4 is applied and the case where the LRU algorithm is applied.

FIG. 5 illustrates a comparative example between the case where the cache eviction processing illustrated in FIG. 4 is applied and the case where the LRU algorithm is applied. Specifically, FIG. 5 illustrates a comparative example between the case where the cache memory CMEM illustrated in FIG. 2 is used and the case where the cache memory adopting the LRU algorithm is used. The vertical axis of FIG. 5 indicates the execution time (unit is second) of Princeton Application Repository for Shared-Memory Computers (PARSEC) benchmark.

When the cache eviction processing illustrated in FIG. 4 is applied, the execution time is approximately 1.967 seconds, and when the LRU algorithm is applied, the execution time is approximately 2.185 seconds. By applying the cache eviction processing illustrated in FIG. 4, the execution time is reduced by approximately 11% compared with the LRU algorithm.

Also, in the cache memory CMEM, the cache miss rate of access to the address ADRb assigned to NVRAM is approximately 0.5% (not illustrated). In the LRU algorithm, the cache miss rate of access to the address ADRb assigned to NVRAM is approximately 1% (not illustrated). Like this, the cache miss rate of access to the address ADRb assigned to NVRAM is improved from approximately 1% to approximately 0.5%. NVRAM has disadvantages, for instance, higher cost of writing compared with DRAM and limitation of the number of times of writing. Therefore, it is disadvantageous to reduce the cache miss rate of access to the address ADRb assigned to NVRAM.

In the above-described embodiment illustrated in FIGS. 2 to 5, the same effect as in the embodiment illustrated in FIG. 1 may also be obtained. For instance, the cache memory CMEM selects data DATA to be evicted from the cache memory CMEM based on a result of the comparison of the product of the latency ratio and the access ratio of DRAM, NVRAM with the cache ratio of DRAM, NVRAM. Thus, data DATA to be evicted from the cache memory CMEM may be appropriately selected. Consequently, it is possible to reduce the average penalty of the cache memory CMEM. In other words, it is possible to reduce the access time to the data DATA stored in the main memory MEM.

Figure 6:
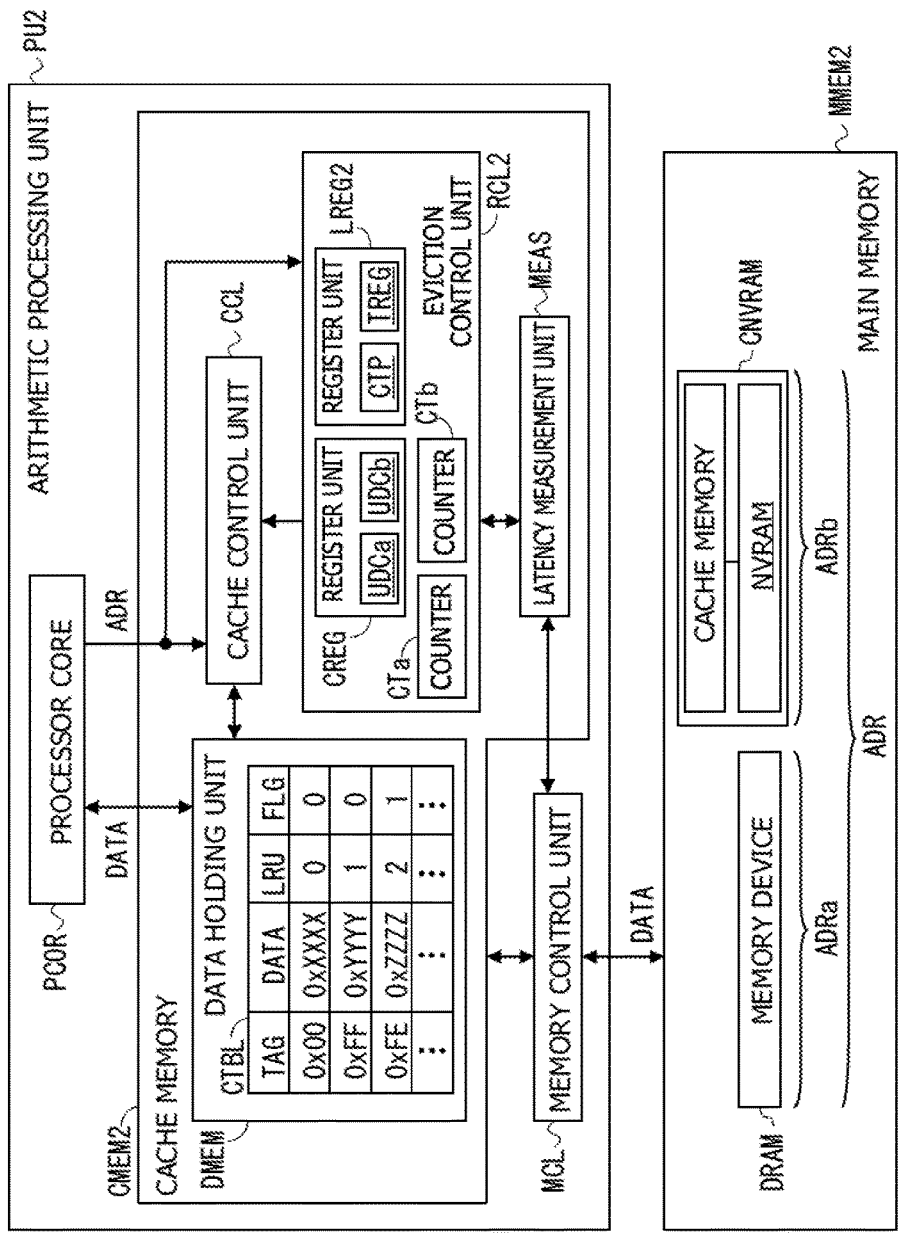
FIG. 6 is a diagram illustrating another embodiment of a cache memory and a method of controlling the cache memory.

FIG. 6 is a diagram illustrating another embodiment of a cache memory and a method of controlling the cache memory. The same or similar components as or to the components described with reference to FIGS. 1 to 5 are labeled with the same or similar symbol, and a detailed description thereof is omitted.

The cache memory CMEM2 illustrated in FIG. 6 is disposed between the processor core PCOR such as a CPU core and a main memory MMEM2, and makes access to the main memory MMEM2 via the memory control unit MCL. It is to be noted that the memory control unit MCL performs data transfer and other operations between the cache memory CMEM2 and the main memory MMEM2.

The cache memory CMEM2, the processor core PCOR, and the memory control unit MCL are mounted in an arithmetic processing unit PU2 such as a CPU. It is to be noted that, for instance, when the cache memory has a hierarchical structure, the cache memory CMEM2 may be disposed externally of the arithmetic processing unit PU2. The main memory MMEM2 has a plurality of memory devices DRAM, CNVRAM with different latencies from each other. For instance, the memory device DRAM is a DRAM. The memory device CNVRAM has NVRAM with a longer latency than DRAM, and a cache memory CM coupled to NVRAM. Thus, the latency of the memory device CNVRAM has different values between the cases where a cache hit occurs in the cache memory CM and where a cache miss occurs in the cache memory CM. Specifically, the memory device CNVRAM is an example of first memory device with a variable latency.

The cache memory CMEM2 includes a data holding unit DMEM that holds part of the data DATA stored in one of the memory devices DRAM, CNVRAM, an the eviction control unit RCL2, a cache control unit CCL, and a latency measurement unit MEAS. The data holding unit DMEM and the cache control unit CCL are the same as or similar to the data holding unit DMEM and the cache control unit CCL illustrated in FIG. 2.

The latency measurement unit MEAS measures a latency of the memory device CNVRAM. For instance, the latency measurement unit MEAS measures a latency which is the time (access time to the main memory MMEM2) until data is transferred since issuance of an access request from the arithmetic processing unit PU2 to the main memory MMEM2. The latency measurement unit MEAS notifies the eviction control unit RCL2 of the measured latency.

The eviction control unit RCL2 calculates the ratio of the latencies of the memory devices DRAM, CNVRAM using the average value of the latency measured by the latency measurement unit MEAS. For instance, the eviction control unit RCL2 has a plurality of counters CT (CTa, CTb) and register units LREG2, CREG. The eviction control unit RCL2 is the same as or similar to the eviction control unit RCL illustrated in FIG. 2 except that the eviction control unit RCL2 has the register unit LREG2 instead of the register unit LREG illustrated in FIG. 2. The counters CTa, CTb and register unit CREG are the same as or similar to the counters CTa, CTb and register unit CREG illustrated in FIG. 2.

The register unit LREG2 has a counter CPT that counts the number of times of measurement of latency by the latency measurement unit MEAS, and a register TREG that holds the sum (cumulative value) of latencies measured by the latency measurement unit MEAS. For instance, the register unit LREG2 calculates the average value of the latency of the memory device CNVRAM by dividing the cumulative value of latency held in the register TREG by the count value CPT of the counter CPT.

The register unit LREG2 holds the value of latency predetermined by the specification or the like of the memory device DRAM, and the average value of the latency of the memory device CNVRAM. Thus, the latency ratio of the memory devices DRAM, CNVRAM is held in the register unit LREG2. The counter CPT and the register TREG are reset periodically.

It is to be noted that the configuration of the cache memory CMEM2 is not limited to the example illustrated in FIG. 6. For instance, the counter CPT and the register TREG may be provided externally of the register unit LREG2. Also, the register unit LREG2 may record the latency measured by the latency measurement unit MEAS in a ring buffer or the like, and may calculate the average of the latency recorded in the ring buffer or the like.

Figure 7:
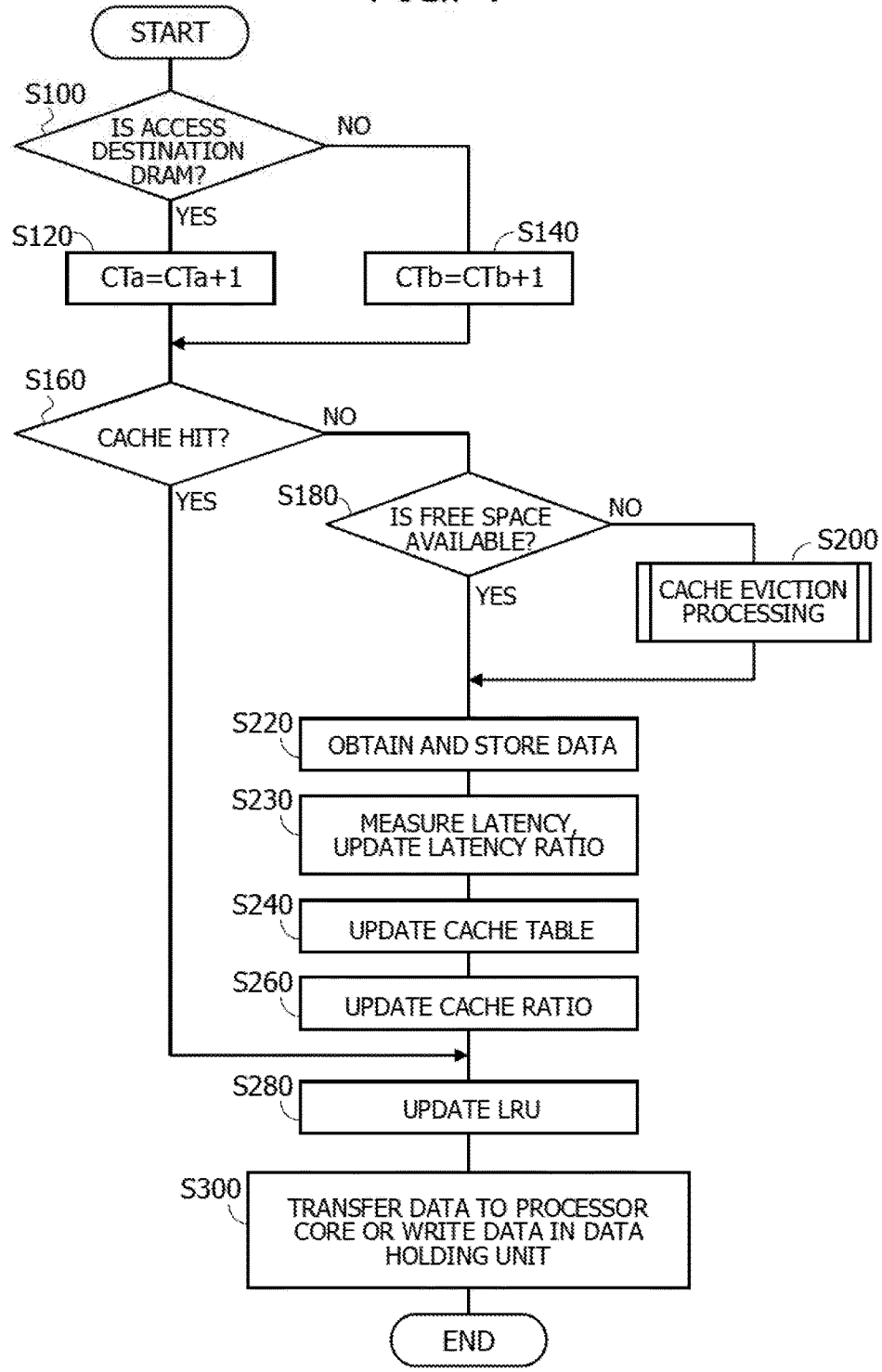
FIG. 7 is a flow chart illustrating an example operation of the cache memory illustrated in FIG. 6.

FIG. 7 illustrates an example operation of the cache memory CMEM2 illustrated in FIG. 6. The operation illustrated in FIG. 7 is the same as or similar to the operation illustrated in FIG. 3 except that the processing in step S230 is added to the operation illustrated in FIG. 3. A detailed description of the processing (processing other than in step S230) described with reference to FIG. 3 is omitted. The cache memory CMEM2 performs the processing in step S230 after performing the processing in step S220.

In step S230, the latency measurement unit MEAS measures a latency of the memory device CNVRAM. The eviction control unit RCL2 then updates the latency ratio of the memory devices DRAM, CNVRAM held in the register unit LREG2 as described with reference to FIG. 6. It is to be noted that measurement of latency of the memory device CNVRAM starts, for instance, at the time of execution (when an access request is issued to the memory device CNVRAM) of the processing in step S220.

After the processing in step S230 is performed, the operation of the cache memory CMEM proceeds to step S240. It is to be noted that when the access target is not the memory device CNVRAM (a memory device with a variable latency), the processing in step S230 is not performed. In this case, after the processing in step S220 is performed, the processing in step S230 is skipped and the processing in step S240 is performed.

It is to be noted that the operation of the cache memory CMEM is not limited to the example illustrated in FIG. 7. For instance, the cache memory CMEM may perform the processing (update of the cache ratio) in step S260 before performing the processing in step S220.

In the above-described embodiment illustrated in FIGS. 6 and 7, the same effect as in the embodiment illustrated in FIGS. 2 to 5 may also be obtained. For instance, the cache memory CMEM2 compares the product of the latency ratio and the access ratio of the memory devices DRAM, CNVRAM with the cache ratio of the memory devices DRAM, CNVRAM. The cache memory CMEM2 then selects data DATA to be evicted from the cache memory CMEM2 based on a result of the comparison. Thus, data DATA to be evicted from the cache memory CMEM2 may be appropriately selected. Consequently, it is possible to reduce the average penalty of the cache memory CMEM2. In other words, it is possible to reduce the access time to the data DATA stored in the main memory MEM2.

In addition, the cache memory CMEM2 measures a latency of the memory device CNVRAM, and updates the latency ratio of the memory devices DRAM, CNVRAM as occasion calls. Thus, even when the cache memory CMEM2 is used in the main memory MMEM2 including the memory device CNVRAM with a variable latency, the cache memory CMEM2 is able to appropriately select data DATA to be evicted from the cache memory CMEM2.

Figure 8:
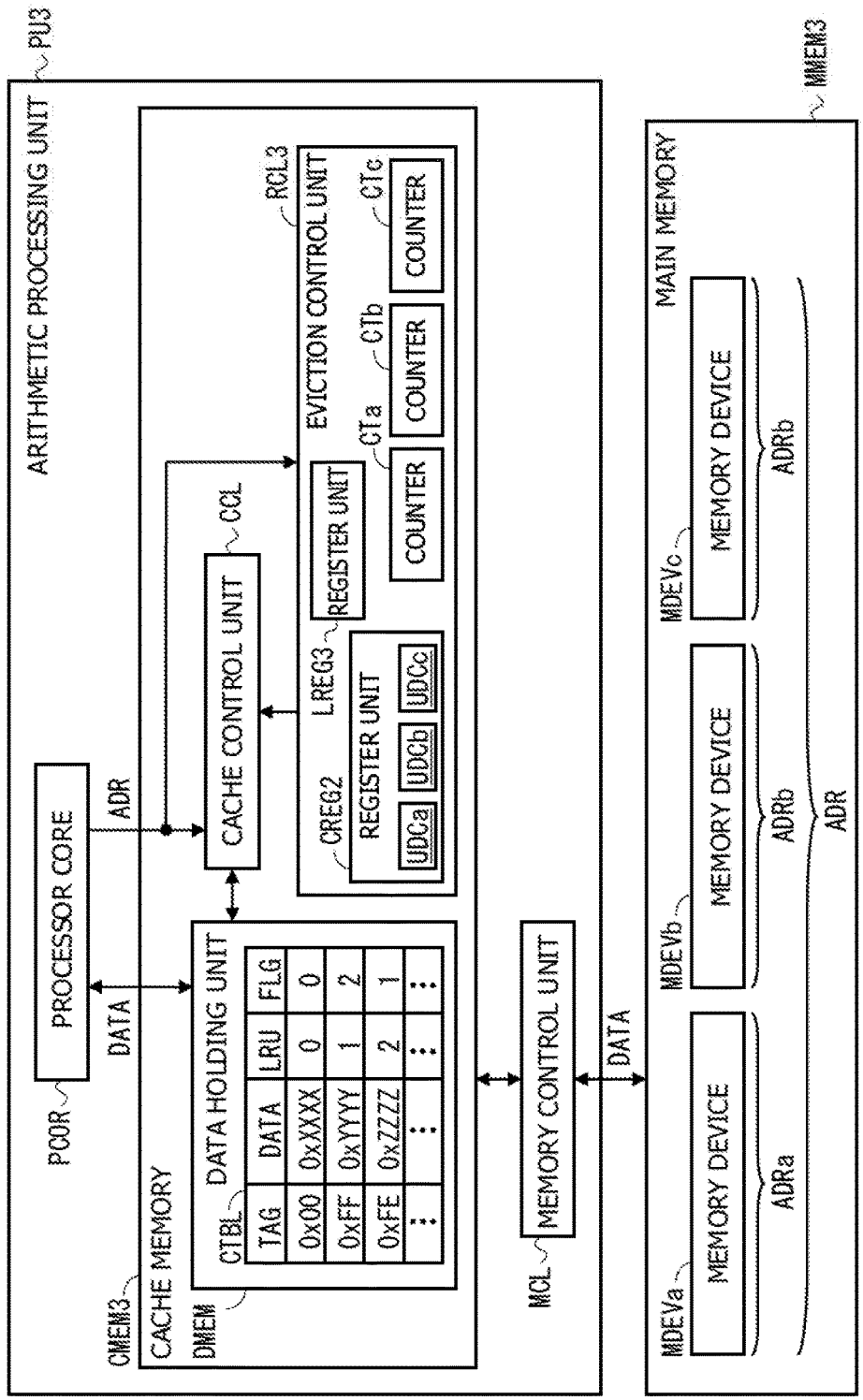
FIG. 8 is a diagram illustrating another embodiment of a cache memory and a method of controlling the cache memory.

FIG. 8 is a diagram illustrating another embodiment of a cache memory and a method of controlling the cache memory. The same or similar components as or to the components described with reference to FIGS. 1 to 7 are labeled with the same or similar symbol, and a detailed description thereof is omitted.

The cache memory CMEM3 illustrated in FIG. 8 is disposed between the processor core PCOR such as a CPU core and a main memory MMEM3, and makes access to the main memory MMEM3 via the memory control unit MCL. It is to be noted that the memory control unit MCL performs data transfer and other operations between the cache memory CMEM3 and the main memory MMEM3.

The cache memory CMEM3, the processor core PCOR, and the memory control unit MCL are mounted in an arithmetic processing unit PU3 such as a CPU. It is to be noted that, for instance, when the cache memory has a hierarchical structure, the cache memory CMEM3 may be disposed externally of the arithmetic processing unit PU3. The main memory MMEM3 has a plurality of memory devices MDEVa, MDEVb, MDEVc with different latencies from each other. The addresses ADRa, ADRb, ADRc indicate respective addresses ADR assigned to the memory devices MDEVa, MDEVb, MDEVc.

The cache memory CMEM3 includes a data holding unit DMEM that holds part of the data DATA stored in one of the memory devices MDEVa, MDEVb, MDEVc, an the eviction control unit RCL3, and a cache control unit CCL. The data holding unit DMEM and the cache control unit CCL are the same as or similar to the data holding unit DMEM and the cache control unit CCL illustrated in FIG. 2.

The eviction control unit RCL3 has, for instance, a plurality of counters CT (CTa, CTb, CTc) and register units LREG3, CREG3, the counters CT being configured to count access to the main memory MMEM3 for each of the memory devices MDEVa, MDEVb, MDEVc. For instance, when request address ADR transferred to the eviction control unit RCL3 indicates the address ADRc, the counter CTc counts access to MDEVc by incrementing the count. Each counter CT is reset periodically.

The register unit CREG2 holds information indicating the cache ratio of the memory devices MDEVa, MDEVb, MDEVc. For instance, the register unit CREG2 has up-down counters UDC (UDCa, UDCb, UDCc).

The up-down counter UDCa counts the number of cache lines that hold the data DATA (hereinafter also referred to as data DATA of the memory device MDEVa) transferred from the memory device MDEVa to the cache memory CMEM3. The up-down counter UDCb counts the number of cache lines that hold the data DATA (hereinafter also referred to as data DATA of the memory device MDEVb) transferred from the memory device MDEVb to the cache memory CMEM3. The up-down counter UDCc counts the number of cache lines that hold the data DATA (hereinafter also referred to as data DATA of the memory device MDEVc) transferred from the memory device MDEVc to the cache memory CMEM3. The register unit CREG2 then holds the count values UDCa, UDCb, UDCc (in other words, the cache ratio of the MDEVa, MDEVb, MDEVc) of each up-down counters UDC. Each up-down counter UDC is reset periodically, for instance, when the number of cache lines of the cache memory CMEM3 exceeds a number countable by the up-down counter UDC.

The register unit LREG3 holds information indicating the latency ratio of the memory devices MDEVa, MDEVb, MDEVc. For instance, the register unit LREG3 holds the value of each latency (that is, the latency ratio of the memory devices MDEVa, MDEVb, MDEVc) predetermined by the specification or the like of the memory devices MDEVa, MDEVb, MDEVc. For instance, the latency of each of MDEVa, MDEVb, MDEVc is given to the eviction control unit RCL3 as a parameter from a firmware or the like.

The eviction control unit RCL3 calculates the product of the latency ratio and the access ratio of the memory devices MDEVa, MDEVb, MDEVc for instance, using the register unit LREG2 and each counter CT. The eviction control unit RCL3 then compares the product of the latency ratio and the access ratio with the cache ratio, and selects eviction data DATA based on a result of the comparison.

It is to be noted that the configuration of the cache memory CMEM3 is not limited to the example illustrated in FIG. 8. For instance, the cache memory CMEM3 may have the latency measurement unit MEAS, the counter CPT, and the register TREG illustrated in FIG. 6.

FIG. 9 illustrates an example operation of the cache memory CMEM3 illustrated in FIG. 8. It is to be noted that the operation of the cache memory CMEM3 other than the cache eviction processing (the processing in step S200 illustrated in FIG. 3) is described by the operation illustrated in FIG. 3. Thus, FIG. 9 illustrates an example of the cache eviction processing. It is to be noted that the operation illustrated in FIG. 9 is an example of the cache eviction processing when data DATA of the memory device MDEVa, data DATA of the memory device MDEVb, data DATA of the memory device MDEVc are present in the eviction candidates.

The processing in step S210 is performed when it is determined no free space is available in the processing in step S180 illustrated in FIG. 3.

In step S210, the eviction control unit RCL normalizes the product of the latency ratio (Da:Db:Dc) and the access ratio (Aa:Ab:Ac) for each of the memory devices MDEVa, MDEVb, MDEVc.

The values Da, Db, Dc of the terms of the latency ratio correspond to the respective latencies of the memory devices MDEVa, MDEVb, MDEVc. Also, the values Aa, Ab, Ac of the terms of the access ratio correspond to the respective count values CTa, CTb, CTc of the counters CTa, CTb, CTc.

When the product of the latency ratio (Da:Db:Dc) and the access ratio (Aa:Ab:Ac) is normalized, the values Ta, Tb, Tc of the terms in the product are given by Expression (2) to Expression (4).

$$Ta=(Aa \times Da)/(Aa \times Da + Ab \times Db + Ac \times Dc) \quad (2)$$

$$Tb=(Ab \times Db)/(Aa \times Da + Ab \times Db + Ac \times Dc) \quad (3)$$

$$Tc=(Ac \times Dc)/(Aa \times Da + Ab \times Db + Ac \times Dc) \quad (4)$$

After the processing in step S210 is performed, the operation of the cache memory CMEM3 proceeds to step S211.

In step S211, the eviction control unit RCL normalizes the cache ratio (Ca:Cb:Cc) of the memory devices MDEVa, MDEVb, MDEVc.

Out of the values Ca, Cb, Cc of the terms of the cache ratio, the value Ca corresponds to the number of cache lines that hold data DATA of the memory device MDEVa, the value Cb corresponds to the number of cache lines that hold data DATA of the memory device MDEVb, and the value Cc corresponds to the number of cache lines that hold data DATA of the memory device MDEVc.

When the cache ratio (Ca:Cb:Cc) is normalized, the values NCa, NCb, NCc of the terms in the cache ratio are given by Expression (5) to Expression (7).

$$NCa=Ca/(Ca+Cb+Cc) \quad (5)$$

$$NCb=Cb/(Ca+Cb+Cc) \quad (6)$$

$$NCc=Cc/(Ca+Cb+Cc) \quad (7)$$

After the processing in step S211 is performed, the operation of the cache memory CMEM3 proceeds to step S212.

In step S212, the eviction control unit RCL determines whether or not the maximum value of quotient values (NCa/Ta, NCb/Tb, NCc/Tc) obtained by dividing the values NC by respective values T is the value (NCa/Ta) which is obtained by dividing the value NCa by the value Ta.

When the value (NCa/Ta) obtained by dividing the value NCa by the value Ta is the maximum value, the operation of the cache memory CMEM3 proceeds to step S214. On the other hand, the value (NCa/Ta) obtained by dividing the value NCa by the value Ta is not the maximum value, the operation of the cache memory CMEM3 proceeds to step S213.

In step S213, it is determined whether or not the maximum value of quotient values (NCa/Ta, NCb/Tb, NCc/Tc) is the value (NCb/Tb) which is obtained by dividing the value NCb by the value Tb. When the value (NCb/Tb) obtained by dividing the value NCb by the value Tb is the maximum value, the operation of the cache memory CMEM3 proceeds to step S215. On the other hand, when the value (NCb/Tb) obtained by dividing the value NCb by the value Tb is not the maximum value, the operation of the cache memory CMEM3 proceeds to step S216.

In step S214, out of the data DATA of the memory device MDEVa in the eviction candidates DRAM, the cache memory CMEM3 evicts data DATA with the lowest LRU from the data holding unit DMEM. The data DATA is evicted from the data holding unit DMEM, and free space is thereby generated in the data holding unit DMEM, then the cache eviction processing is completed. After the processing in step S214 is performed, the operation of the cache memory CMEM3 proceeds to step S220 illustrated in FIG. 3.

In step S215, out of the data DATA of the memory device MDEVb in the eviction candidates, the cache memory CMEM3 evicts data DATA with the lowest LRU from the data holding unit DMEM. The data DATA is evicted from the data holding unit DMEM, and free space is thereby generated in the data holding unit DMEM, then the cache eviction processing is completed. After the processing in step S215 is performed, the operation of the cache memory CMEM3 proceeds to step S220 illustrated in FIG. 3.

In step S216, out of the data DATA of the memory device MDEVc in the eviction candidates, the cache memory CMEM3 evicts data DATA with the lowest LRU from the data holding unit DMEM. The data DATA is evicted from the data holding unit DMEM, and free space is thereby generated in the data holding unit DMEM, then the cache eviction processing is completed. After the processing in step S216 is performed, the operation of the cache memory CMEM3 proceeds to step S220 illustrated in FIG. 3.

In this manner, the cache memory CMEM3 evicts from the data holding unit DMEM data DATA of the memory device MDEV corresponding to the maximum value of quotient values (NCa/Ta, NCb/Tb, NCc/Tc) obtained by dividing the values NC by respective values T. Thus, for instance, it is possible to avoid data DATA transferred from each of the memory devices MDEVa, MDEVb, MDEVc from remaining in the data holding unit DMEM in an excessive volume with respect to the access frequency. Thus, data DATA to be evicted from the data holding unit DMEM may be appropriately selected. Consequently, the cache memory CMEM3 is able to restrain the increase in the average penalty.

It is to be noted that the cache eviction processing is not limited to the example illustrated in FIG. 9. For instance, when data DATA transferred from only one of the memory devices MDEVa, MDEVb, MDEVc is present in the eviction candidates, the cache memory CMEM3 evicts data DATA with the lowest LRU among the eviction candidates.

Also, when data DATA transferred from just two of the memory devices MDEVa, MDEVb, MDEVc is present in the eviction candidates, the quotient values (NC/T) corresponding to the two memory devices MDEV are compared. The cache memory CMEM3 then evicts data DATA of the memory device MDEV corresponding to the larger one of the quotient values (NC/T) corresponding to the two memory devices MDEV.

Alternatively, when the number of memory devices MDEV in the main memory MMEM3 is four or greater, the cache memory CMEM3 selects a memory device MDEV corresponding to the maximum value of respective quotient values (NC/T) corresponding to the memory devices MDEV. The cache memory CMEM3 then evicts from the data holding unit DMEM, data DATA with the lowest LRU in the data DATA (and the eviction candidates) of the selected memory device MDEV.

In the above-described embodiment illustrated in FIGS. 8 and 9, the same effect as in the embodiment illustrated in FIGS. 2 to 5 may also be obtained. For instance, the cache memory CMEM3 compares the product of the latency ratio and the access ratio of the memory devices MDEVa, MDEVb, MDEVc with the cache ratio of the memory devices MDEVa, MDEVb, MDEVc. The cache memory CMEM3 then selects data DATA to be evicted from the cache memory CMEM3 based on a result of the comparison. Thus, data DATA to be evicted from the cache memory CMEM3 may be appropriately selected. Consequently, it is possible to reduce the average penalty of the cache memory CMEM3. In other words, it is possible to reduce the access time to the data DATA stored in the main memory MEM3.

The characteristics and advantages of the embodiments will be apparent from the detailed description above. This intends that the appended claims cover the characteristics and advantages of the embodiments as described above in a range not departing from the spirit and the scope. The person having ordinary skill in the art could have easily conceived any improvements and changes. Therefore, the scope of the inventive embodiments is not intended to be limited to that described above, and suitable modifications and equivalents included in the scope disclosed by the embodiments may be resorted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
   a first memory; and
   a processor coupled to the first memory and configured to:
      transmit a first request requesting a second memory to send first data,
      receive the first data from the second memory,
      transmit a second request requesting a third memory to send second data,
      receive the second data from the third memory,
      store the first data and the second data in the first memory,
      specify a first latency that is a time from when the second memory receives the first request to when the second memory sends the first data to the information processing device, and a second latency that is a time from when the third memory receives the second request to when the third memory sends the second data to the information processing device,
      specify a first access frequency from the information processing device to the second memory, and a second access frequency from the information processing device to the third memory,
      select one of the first data and the second data based on a first ratio of a first value to a second value and a second ratio of a first data volume of the first data stored in the first memory to a second data volume of the second data stored in the first memory, the first value being obtained by multiplying the first latency and the first access frequency, and the second value being obtained by multiplying the second latency and the second access frequency, and
      delete, from the first memory, at least a part of the selected first data or at least a part of the selected second data.

2. The information processing device according to claim 1, wherein the processor is further configured to:
   obtain third data from one of the second memory and the third memory, and
   store the third data in the first memory after the part of the selected first data or the part of the selected second data is deleted from the first memory.

3. The information processing device according to claim 2, wherein the processor is configured to:
   when free space of the first memory is less than a third data volume of the third data, delete the part of the selected first data or the part of the selected second data from the first memory.

4. The information processing device according to claim 1, wherein the processor is further configured to:
   compare the first ratio with the second ratio, and thereby to select one of the first data and the second data.

5. The information processing device according to claim 1, wherein the processor is further configured to:
   count a number of times of access to the second memory and count a number of times of access to the third memory.

6. The information processing device according to claim 1, wherein the processor is configured to:
   when the first data is selected, select data, as the part of the selected first data, which has not been used for arithmetic processing by the processor for a longest time among the first data stored in the first memory, and, when the second data is selected, select data, as the part of the selected second data, which has not been used for arithmetic processing by the processor for a longest time among the second data stored in the first memory.

7. The information processing device according to claim 1, wherein the processor is further configured to:
   when the first latency changes with time, calculate an average value of the first latency, and
   when the second latency changes with time, calculate an average value of the second latency.

8. The information processing device according to claim 2, further comprising:
   a cache memory including the first memory and the processor, wherein
   the second memory and the third memory are main memories coupled to the information processing device.

9. An information processing device comprising:
   a cache memory configured to store data read from a plurality of main memories with different latencies each of which is a time from reception of a data read request until transmission of data; and
   a processor coupled to the cache memory and configured to:
      specify, for each of the main memories, the latency,
      specify, for each of the main memories, an access frequency from the information processing device to each of the main memories,
      specify, for each of the main memories, a first value by multiplying the latency and the access frequency,
      specify, for each of the main memories, a volume of data that is stored in each of the main memories and that is stored in the cache memory, and delete, from the cache memory, at least a part of the data stored in the cache memory based on the first value and the volume of the data.

10. A method executed by an information processing device including a first memory, the method comprising:
transmitting a first request requesting a second memory to send first data;
receiving the first data from the second memory;
transmitting a second request requesting a third memory to send second data;
receiving the second data from the third memory;
storing the first data and the second data in the first memory;
specifying a first latency that is a time from when the second memory receives the first request to when the second memory sends the first data to the information processing device, and a second latency that is a time from when the third memory receives the second request to when the third memory sends the second data to the information processing device;
specifying a first access frequency from the information processing device to the second memory, and a second access frequency from the information processing device to the third memory;
selecting one of the first data and the second data based on a first ratio of a first value to a second value and a second ratio of a first data volume of the first data stored in the first memory to a second data volume of the second data stored in the first memory, the first value being obtained by multiplying the first latency and the first access frequency, and the second value being obtained by multiplying the second latency and the second access frequency; and
deleting, from the first memory, at least a part of the selected first data or at least a part of the selected second data.

11. The method according to claim 10, further comprising:
obtaining third data from one of the second memory and the third memory; and
storing the third data in the first memory after the part of the selected first data or the part of the selected second data is deleted from the first memory.

12. The method according to claim 11, wherein the deleting is executed when free space of the first memory is less than a third data volume of the third data.

13. The method according to claim 10, further comprising:
comparing the first ratio with the second ratio, wherein the selecting is executed based on the comparing.

14. The method according to claim 10, further comprising:
counting a number of times of access to the second memory; and
counting a number of times of access to the third memory.

15. The method according to claim 10, further comprising:
when the first data is selected, selecting data, as the part of the selected first data, which has not been used for arithmetic processing by the processor for a longest time among the first data stored in the first memory, and, when the second data is selected, selecting data, as the part of the selected second data, which has not been used for arithmetic processing by the processor for a longest time among the second data stored in the first memory.

16. The method according to claim 10, further comprising:
when the first latency changes with time, calculating an average value of the first latency; and
when the second latency changes with time, calculating an average value of the second latency.

17. The method according to claim 11, wherein:
the information processing device includes a cache memory including the first memory and the processor, and
the second memory and the third memory are a main memory coupled to the information processing device.

* * * * *